(12) United States Patent
Laaksonen (10) Patent No.: US 8,478,370 B2
(45) Date of Patent: Jul. 2, 2013

(54) SLIDE DEVICE AND SLIDE ASSEMBLY

(75) Inventor: Mikko Antti-Pekka Laaksonen, Salo (FI)

(73) Assignee: Nokia Corporation, Espoo (FI)

( * ) Notice: Subject to any disclaimer, the term of this patent is extended or adjusted under 35 U.S.C. 154(b) by 425 days.

(21) Appl. No.: 12/810,011

(22) PCT Filed: Dec. 21, 2007

(86) PCT No.: PCT/EP2007/011363
§ 371 (c)(1),
(2), (4) Date: Jun. 21, 2010

(87) PCT Pub. No.: WO2009/080083
PCT Pub. Date: Jul. 2, 2009

(65) Prior Publication Data
US 2010/0279750 A1 Nov. 4, 2010

(51) Int. Cl.
*F16C 29/02* (2006.01)
*H04W 88/02* (2009.01)

(52) U.S. Cl.
USPC .................. 455/575.4; 455/575.1; 361/679.39

(58) Field of Classification Search
USPC ........... 455/575.1–575.9; 361/679.01–679.61
See application file for complete search history.

(56) References Cited

U.S. PATENT DOCUMENTS

| 7,822,446 | B2 * | 10/2010 | Vatanparast et al. | 455/575.4 |
| 2006/0046783 | A1 | 3/2006 | Bae | |
| 2006/0142073 | A1 * | 6/2006 | Gordecki | 455/575.4 |
| 2007/0006421 | A1 * | 1/2007 | Park et al. | 16/334 |

FOREIGN PATENT DOCUMENTS

EP 1715661 A 10/2006

OTHER PUBLICATIONS

International Search Report and Written Opinion of the International Searching Authority for PCT/EP2007/011363 dated Aug. 25, 2008, pp. 1-10.

* cited by examiner

*Primary Examiner* — Kashif Siddiqui
(74) *Attorney, Agent, or Firm* — Harrington & Smith (57) ABSTRACT

A slide device with two housing parts that can be slid relatively to one another comprises a slide assembly. The slide assembly comprises a sheet or plate material slider and a sheet or plate material base. The slider has displaced portions and the base is provided with slots. The slider is received through the slots with the displaced portions. This construction provides for a substantially reduced building height of the slide assembly and thereby for a substantially reduced building height of a device in which the slide assembly is used.

14 Claims, 6 Drawing Sheets

SLIDE DEVICE AND SLIDE ASSEMBLY

RELATED APPLICATION

This application was originally filed as PCT Application No. PCT/EP2007/011363 filed Dec. 21, 2007.

FIELD OF THE INVENTION

The present invention relates to a slide assembly, in particular a slide assembly for device with two housing portions that can be slid relative to one another, and to such a device.

BACKGROUND OF THE INVENTION

Slide type electronic devices, i.e. devices with two housing portions that can slide relative to one another have recently become increasingly popular. The slide mechanism is required to provide accurate and smooth guiding, be reliable and inexpensive. Further, there has been a trend for these devices (such as mobile phones) to be constructed with an overall housing thickness that is as little as possible, so called slim design. The challenge in obtaining a thin housing is particularly big for slide devices since the slide mechanism adds to the building height.

Conventional slide assemblies include a base that is provided with rails along its sides. The rails embrace a sheet material slider. Typically, the base part in a slider is made of sheet metal and a layer of plastic is overmolded into the rails for reduction of friction and providing more smooth movement between the slider and the base. The height of the rails embracing the slider and the plastic material therebetween has been the limiting factor for reducing the overall height of slide assemblies.

DISCLOSURE OF THE INVENTION

On this background, it is an object of the present invention to provide a slide assembly with a reduced overall building height.

This object is achieved by providing a device comprising two housing parts that are slidably connected to one another by a slide assembly, the slide assembly comprising a base and a slider, the base providing guidance to the slider along an elongated slide path, the slider is provided with an elongated guide surface on one side with a first direction and with an elongated guide surface on the other side with a second direction substantially opposite to the first direction, the base is provided with an elongated guide surface with the second direction that interacts with the elongated guide surface of the slider with the first direction, and the base is provided with an elongated guide surface with the first direction that interacts with the elongated guide surface of the slider with the second direction, wherein the portion of the slider with the guide surface with the first direction is displaced relative to the portion of the slider with the guide surface with the second direction.

Thus, the overall building height of the slide assembly (and the device) can be reduced since the base 22 does not need to locally embrace the slider on both sides. With the proposed solution the embracing is distributed over the width of the slide assembly, thereby allowing the building height to be substantially reduced.

The object above is also achieved by providing a slide assembly comprising a base and a slider, the base providing guidance to the slider along an elongated slide path, the slider is provided with an elongated guide surface on one side with a first direction and with an elongated guide surface on the other side with a second direction substantially opposite to the first direction, the base is provided with an elongated guide surface in the second direction that interacts with the elongated guide surface of the slider with the first direction, and the base is provided with an elongated guide surface in the first direction that interacts with the elongated guide surface of the slider with the second direction, wherein the portion of the slider with the guide surface with the first direction is displaced relative to the portion of the slider with the guide surface with the second direction.

The slider can be a sheet or plate material slider.

The base can be a sheet or plate material base.

In an embodiment the slider is stepped, and the guide surface with a normal in the first direction is placed one side of the step and the guide surface with a normal in the second direction is placed on the other side of the step. The transition between the portion on the one side of the step in the portion on the other side of the step can be sharp and/or smooth.

The guide surface with a normal in the first direction of the base part may be provided on a first portion of the base and guide surface of the base with a normal in the second direction may be formed on a second portion of the base.

The first portion of the base and the second portion of the base maybe connected to one another at the extremities of the slide path. Thus, the portions of the base can be held together during production and assembly.

The displacement may result in one portion of the slider to be substantially aligned with one portion of the base and the other portion of the slider to be substantially aligned with another portion of the base.

Preferably, the base and the slider are sheet metal parts.

The displacement may be over a distance that substantially corresponds to the thickness of the sheet metal of the slider and/or the base part.

A plastic coating or layer may be provided on the guide surface of the slider or the base part.

The slider may have two guide surfaces with a normal in the first direction and the base may have two downwardly directed guide surfaces with a normal in the second direction.

The displacement may be over a distance that substantially corresponds to the combined thickness of the sheet metal of the slider and/or the base part with the thickness of the plastic layer.

The base part may have two lateral surfaces and the slider has two lateral side surfaces.

The plastic layer or layers may be overmolded layers.

The object above can also be achieved by providing a slide assembly comprising a base and a slider, the base providing guidance to the slider along an elongated slide path, said slider being stepped, said base being stepped, the step of the base being provided with a slit, and the step of said slider being received through said slit.

The step may extend in the direction of the elongated slide path.

The slider and said base can be stepped near two opposite extremities thereof.

The extremities of the base may form rail like guide members.

A central portion of the slider can be disposed on one side of the base and the extremities of the slider can be disposed on the opposite side of the base.

Further objects, features, advantages and properties of the mobile battery charging device and method of according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the slide assembly and the device according to the invention will be described by the preferred embodiments. The device is described in detail as an implementation in a mobile device, e.g. a personal digital assistant (PDA), mobile terminal or a mobile communication terminal in detail in the form of a cellular/mobile phone by the preferred embodiments.

Figure 1:
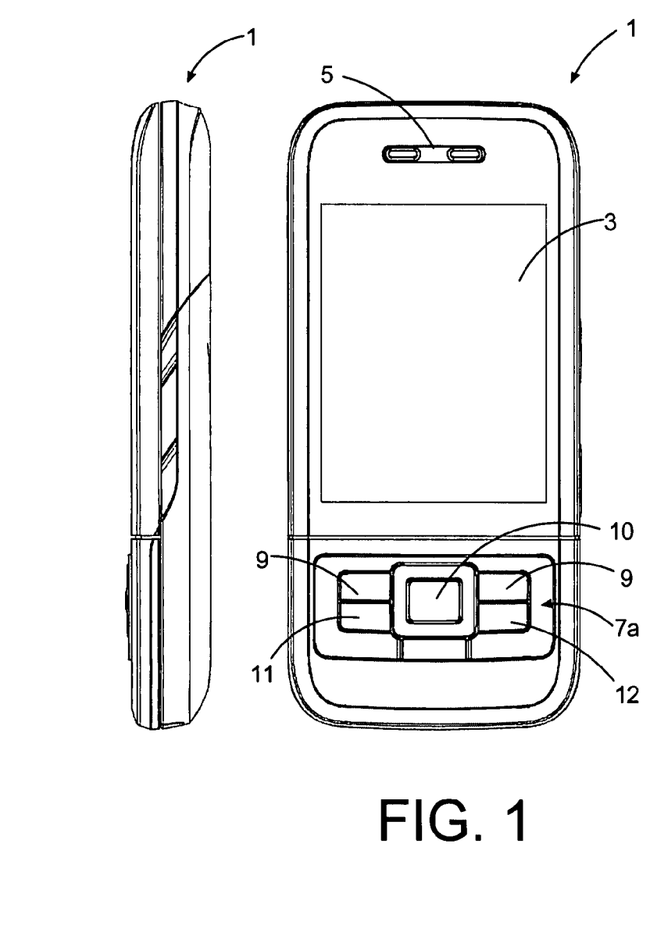
FIG. 1 is a front and side view of a device according to an embodiment the invention in a retracted state.
Figure 2:
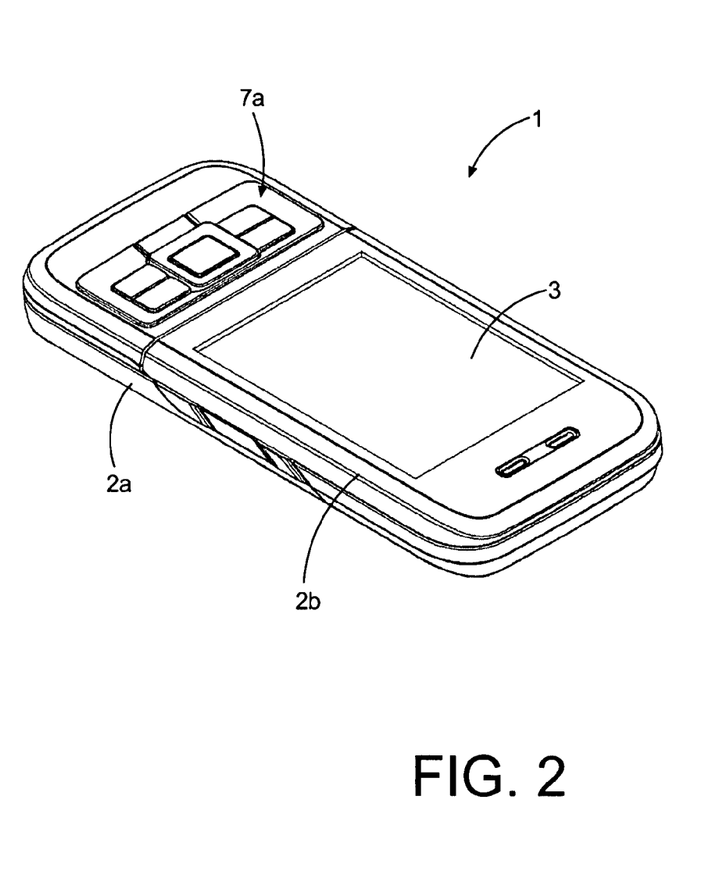
FIG. 2 is an elevated view of the device shown in FIG. 1.
Figure 3:
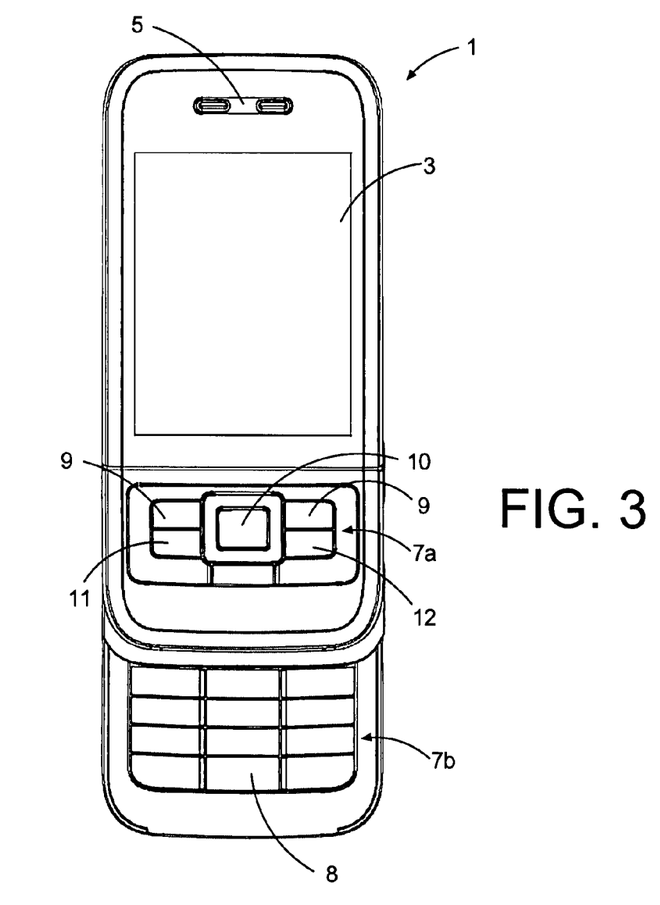
FIG. 3 is a front view of the device shown in FIG. 1 in an extended state.
Figure 4:
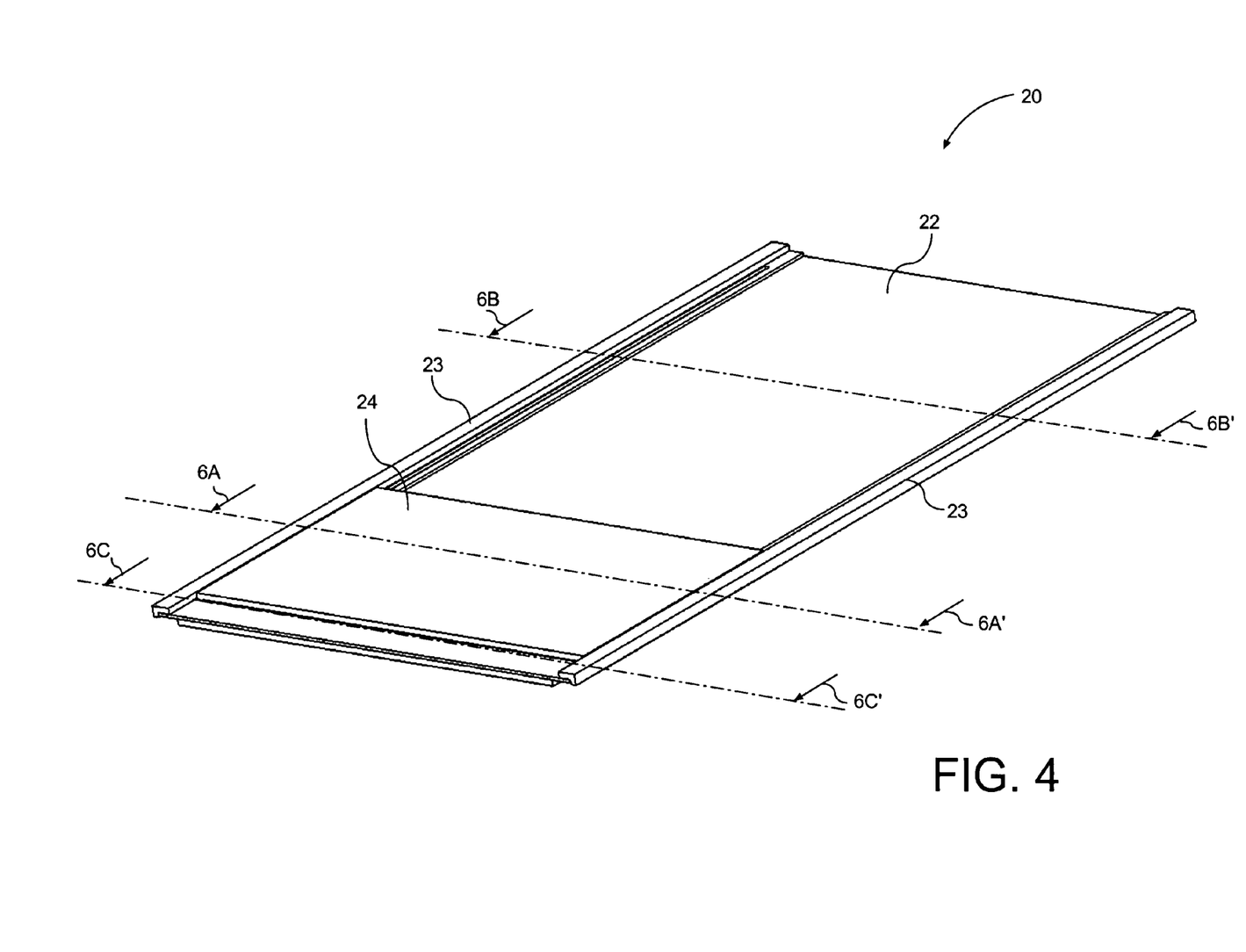
FIG. 4 is an elevated view of a slide assembly according to an embodiment of the invention.

FIGS. 1 to 4 illustrate a first embodiment of a mobile device according to the invention in the form of a mobile telephone by a front view, a side view and a perspective view in a retracted position (FIGS. 1 and 2) and an extended position (FIGS. 3 and 4). The mobile phone 1 has a housing including housing part 2a, housing part 2b housing part 2c, a display screen 3, an on/off button (not shown), a speaker 5 (only the opening is shown), and a microphone (not visible in FIG. 1). The phone 1 according to the first preferred embodiment is adapted for communication via a cellular network, such as the GSM 900/1800 MHz network, but could just as well be adapted for use with a Code Division Multiple Access (CDMA) network, a 3G network, or a Transmission Control Protocol/Internet Protocol (TCP/IP)-based network to cover a possible Voice over Internet Protocol (VoIP)-network (e.g. via Wireless local area network (WLAN), Worldwide Interoperability for Microwave Access (WIMAX) or similar) or a mix of VoIP and Cellular such as UMA (Universal Mobile Access).

The operating face includes a keypad and the display screen 3. The keypad is divided in a first part 7a and a second part 7b. The second part 7b is disposed on the first housing part 2a and has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The second keypad part 7b includes a group of keys comprising two softkeys 9, two call handling keys (offhook key 11 and onhook key 12), and a 5-way navigation key 10 (up, down, left, right and center: select/activate). The function of the softkeys 9 depends on the state of the phone, and navigation in the menu is performed by using the navigation-key 10. The present function of the softkeys 9 is shown in separate fields (soft labels) in a dedicated area 4 of the display 3, just above the softkeys 9. The two call handling keys 11,12 are used for establishing a call or a conference call, terminating a call or rejecting an incoming call. This key layout is typical for many mobile phones, however, it is understood that completely different layout for the keypad and user interface can be used with different embodiments of the invention.

The navigation key 10 is a four- or five-way key which can be used for cursor movement, scrolling and selecting (five-way key) and is placed centrally on the front surface of the phone between the display 3 and the group of alphanumeric keys 7.

A releasable rear cover (not shown) gives access to the SIM card (not shown), and the battery pack (not shown) in the back of the phone that supplies electrical power for the electronic components of the mobile phone 1.

The mobile phone 1 has a flat display screen 3 that is typically made of an LCD with optional back lighting, such as a thin film transistor (TFT) matrix capable of displaying color images. A touch screen may be used on top of a conventional liquid crystal (LCD) display.

The second housing part 2b is slidably connected to the first housing part 2a, and can assume a retracted position shown in FIGS. 1 and 2 and an extended position shown in FIGS. 3 and 4. In the retracted position shown in FIGS. 1 and 2 the second housing part 2b conceals the second keypad part 7b.

In the extended position shown in FIGS. 3 and 4 the second keypad part 7b is not concealed and the second housing part extends from the first housing part 2a.

In use, the user slides the second housing part 2b towards the extended position in order to get access to the alphanumeric keypad 7b or in order to answer a call.

The Slide Assembly.

Figure 5:
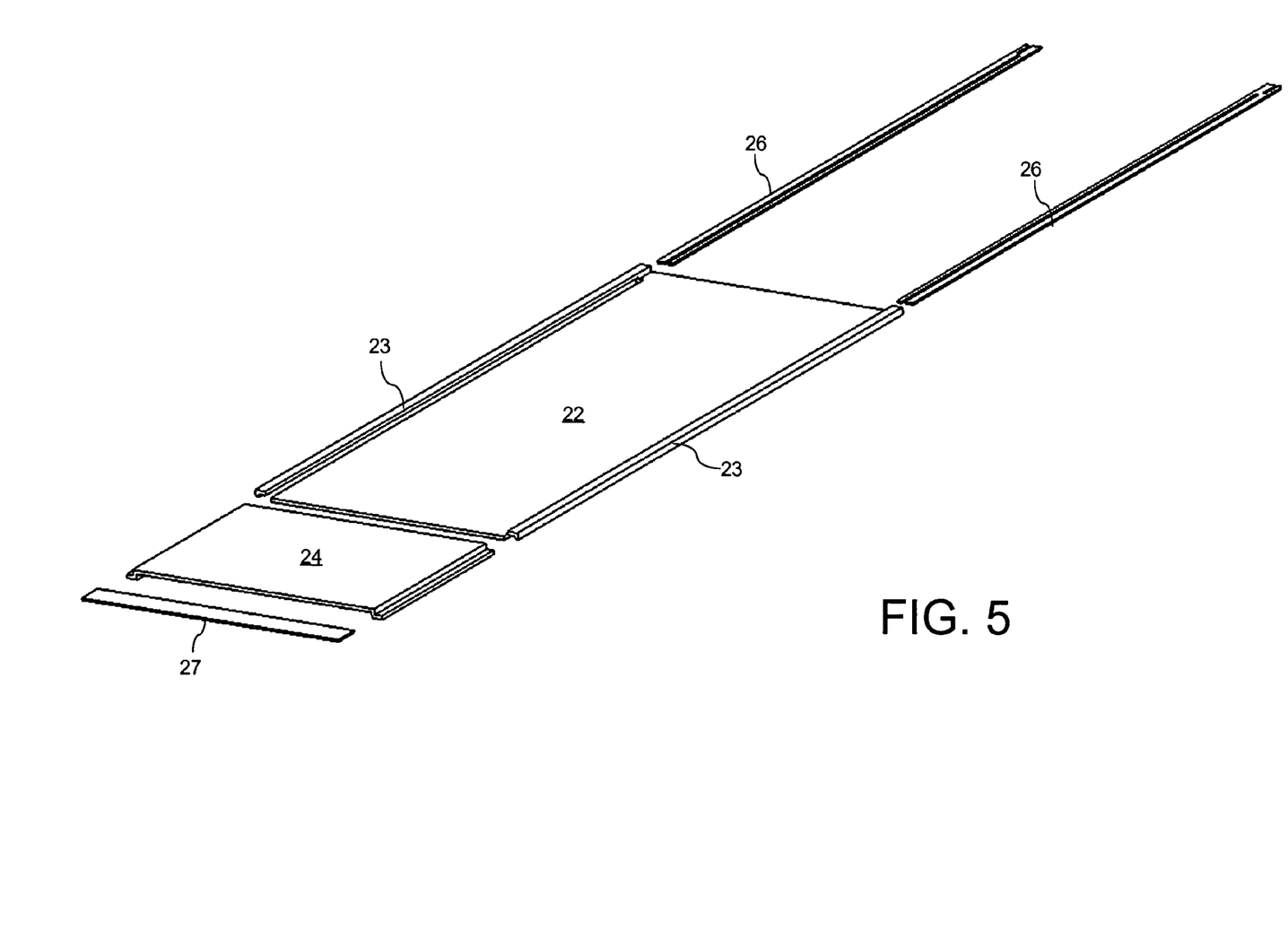
FIG. 5 is an exploded view of the slide assembly shown in FIG. 4.

A slide assembly 20 shown in FIGS. 4 and 5 enables the sliding movement between the first and second housing parts 2a,2b. The slide assembly 20 includes a base part and a slider 24. The slider 24 can move back and forth along the base along and an elongated slide path. The base 22 comprises a plate shaped central member with rail members 23 extending along the central plate member with an elongated slot there between. The elongated slot defines an elongated path along which the slider 24 can move back and forth between two extreme positions.

In an embodiment, the base 22 is made from sheet-metal and shaped by forming. In an embodiment the rail numbers 23 and the central plate like member of the base 22 are formed by a single integral sheet metal member. As shown in FIG. 5 the rails 23 are integral with the central plate like portion of the base 22 near one of the extremities of the rails 23.

In an embodiment the slide assembly includes elongate plastic strips 26 for reducing friction between the base 22 and the slider 24 and for improving smooth operation of the slide assembly 20. In an embodiment these plastic strips 26 are over molded onto the base 22. The molding procedure provides the base 22 with a highly improved shape accuracy, which is essential since the shape accuracy of a sheet-metal part is relatively limited and can be highly improved by over molding plastic parts to the sheet-metal part.

Figure 6A:
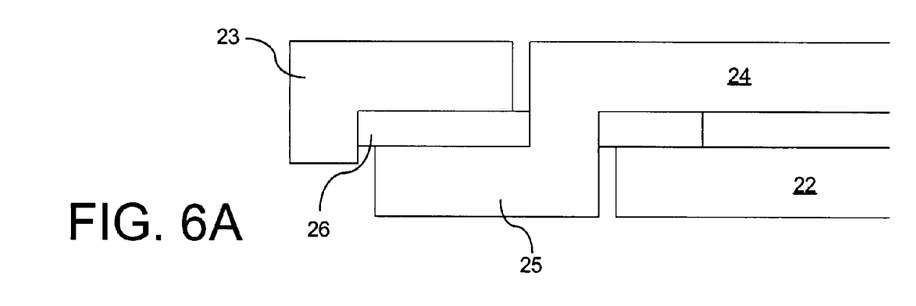
FIG. 6A is a cross-sectional view along the line 6A-6A' in FIG. 4.
Figure 6B:
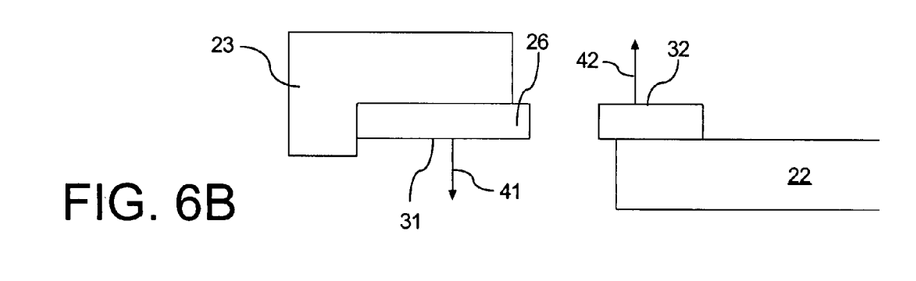
FIG. 6B is a cross-sectional view along the line 6B-6B' in FIG. 4.

As shown in FIG. 6B, the plastic strips 26 include a slot through which the slider 24 is received. The strips 26 provide a guide surface 31 with a normal 41 in a first direction at the portion of the plastic strips 26 that is supported by the respective rail 23 and the plastic strips 26 provide a guide surface 32 with a normal 42 in the second direction along the periphery of the central portion of the base 22. In this context the "normal" is the so called "normal vector" to the surface, is perpendicular to the surface.

In embodiments (not shown) without the plastic strips 26 the guide surfaces 31 and 32 can be provided by the base 22 itself. In such an embodiment the guide surfaces 31,32 of the base 22 may be provided with a coating for reducing friction and improving smooth operation of the slide assembly 20.

Figure 6C:
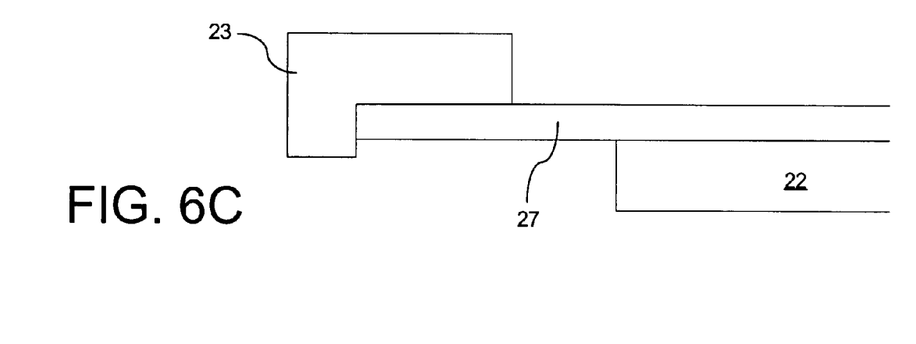
FIG. 6C is a cross-sectional view along the line 6C-6C' in FIG. 4.

As shown in FIG. 6C the extremities of the rails 23 that are not integrally connected to the central portion of the base 22 are connected to the central portion of the base 22 by a connection strip 27. The connection strip 27 is in an embodiment secured to the central portion of the base 22 and two the extremities of the rails 23 by welding (after the slider 24 has been received on the base 22). The connection strip 27 limits the range of movement of the slider 24 and forms an end of stroke limiter that ensures that the slider 24 cannot get out of the slots in the base 22.

The slider 24 is an embodiment made from sheet-metal and shaped by forming. As can be seen in FIG. 6A, the slider 24 is shaped to fit through the slots between the rails 23 and the central portion of the base 22.

In an embodiment the slider 24 is stepped along two opposite edges to create a central portion and two displaced portions 25 on either side of the slider 24. The displaced portions 25 may according to another embodiment (not shown) be created without a step by a smooth transition between the central portion of the slider 24 and the two displaced portions 25.

Figure 7:
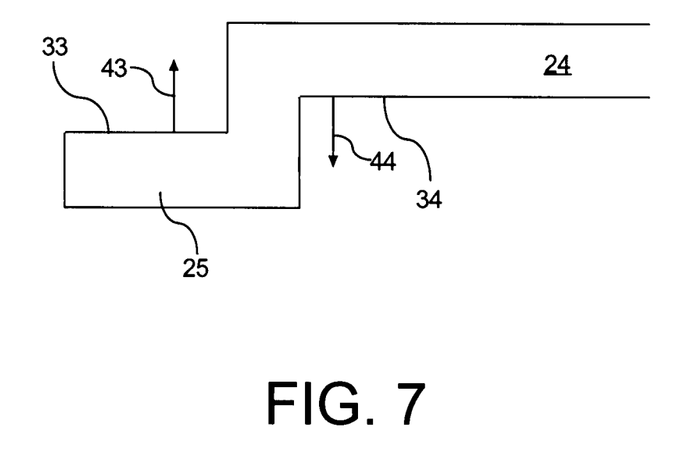
FIG. 7 is a detail of a cross-sectional view through a slider of the slide assembly shown in FIGS. 4,5,6A-6C.

As shown in FIG. 7, the displaced portion 25 of the slider 24 provides a guide surface 33 with a normal 43 in the second direction and the central portion of the slider 24 provides a guide surface 34 with a normal 44 in the first direction.

The guide surface 33 interacts with the guide surface 31 and the guide surface 32 interacts with guide surface 34 to ensure proper guidance of the slider 24 in the first and second direction.

In an embodiment, the displacement of the displaced portions 25 results in the displaced portions to be substantially aligned with the central portion of the base 22 and the central portion of the slider 24 to be substantially aligned with the rails 23.

As shown in FIGS. 6A and 6B the slot in the plastic strips 26 provide lateral guidance for the slider 24. In embodiments (not shown) without the plastic strips 26 the lateral guidance is provided by the slots between the rails 23 and the central portion of the base 22. The respective contact surfaces of these slots may in such embodiments be provided with a friction reducing coating.

In an embodiment displacement of the displaced portions 25 relative to the central portion of the slider 24 is over a distance that substantially corresponds to the thickness of the sheet metal of the slider and/or the base part. In embodiments that are provided with the plastic strips 26, the displacement can be over a distance that substantially corresponds to the combined thickness of the sheet metal of the slider 24 and/or the base part 22 with the thickness of the plastic layer 26.

When the slide assembly 20 is used in a device with two housing parts, one of the housing parts is secured to the base and the other housing part is secured to the slider.

The invention has numerous advantages. Different embodiments or implementations may yield one or more of the following advantages. It should be noted that this is not an exhaustive list and there may be other advantages which are not described herein. One advantage of the invention is that it allows for a substantially reduced building height of the slide assembly and of a device in which the slide assembly is used. It is another advantage of the invention that it provides for a relatively simple structure.

The term "comprising" as used in the claims does not exclude other elements or steps. The term "a" or "an" as used in the claims does not exclude a plurality.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. Moreover, it should be appreciated that those skilled in the art, upon consideration of the present disclosure, may make modifications and/or improvements on the device hereof and yet remain within the scope and spirit hereof as set forth in the following claims.

The invention claimed is:

1. A slide assembly comprising a base and a slider slidably engaged with the base via a first rail on a first edge of the base and a second rail on a second edge of the base,
  a first sliding strip coupled to the first rail and positioned between the first rail and the slider,
  a second sliding strip coupled to the base and positioned between the base and the slider,
  a third sliding strip coupled to the second rail and positioned between the second rail and the slider, and
  a fourth sliding strip coupled to the base and positioned between the base and the slider,
  the base providing guidance to the slider along a slide path,
  the slider having a first slider guide surface on a first side facing a first direction, a second slider guide surface on a second side facing a second direction, a third slider guide surface on the first side facing the first direction, and a fourth slider guide surface on the second side facing the second direction, the first direction being substantially opposite to the second direction,
  the first rail having a first rail guide surface facing the second direction that interacts with the first slider guide surface through the first sliding strip,
  the base having a second base guide surface facing the first direction that interacts with the second slider guide surface through the second sliding strip,
  the second rail having a second rail guide surface facing the second direction that interacts with the third slider guide surface through the third sliding strip,
  the base having a fourth base guide surface facing the first direction that interacts with the fourth slider guide surface through the fourth sliding strip, and
  a portion of the first slider guide surface being displaced relative to a portion of the second slider guide surface and a portion of the third slider guide surface being displaced relative to a portion of the fourth slider guide surface.

2. The slide assembly according to claim 1, wherein the slider is at least one of a sheet material and plate material slider.

3. The slide assembly according to claim 1, wherein the base is at least one of a sheet material and plate material base.

4. The slide assembly according to claim 1, wherein the slider having a step and the first slider guide surface and the second slider guide surface being on opposite sides of the step.

5. The slide assembly according to claim 1, wherein the second base guide surface is provided on a first portion of the base and the first base guide surface is formed on a second portion of the base.

6. The slide assembly according to claim 5, wherein the first portion of the base and the second portion of the base are connected to one another at ends of the slide path.

7. The slide assembly according to claim 1, wherein the displacement results in a portion of the slider to be substantially aligned with a portion of the base and another portion of the slider to be substantially aligned with another portion of the base.

8. The slide assembly according to claim 1, wherein the base and the slider are sheet metal parts.

9. The slide assembly according to claim 7, wherein the displacement comprises a distance that substantially corresponds to at least one of a thickness of the sheet metal of the slider and a thickness of the base part.

10. The slide assembly according to claim 1, wherein the displacement is over a distance that substantially corresponds to a thickness of at least one of the slider and the base.

11. The slide assembly according to claim 1, wherein the slider has two guide surfaces having the first direction and wherein the base has two guide surfaces having the second direction.

12. The slide assembly according to claim 1, wherein the base has two lateral guide surfaces and the slider has two lateral side surfaces.

13. The slide assembly according to claim 1, wherein the first sliding strip, the second sliding strip, the third sliding strip, and the fourth sliding strip are coupled to the base by overmolding.

14. The device comprising two housing parts that are slidably connected to one another by a slide assembly according to claim 1.

* * * * *